United States Patent [19]
Endres et al.

[11] Patent Number: 5,273,670
[45] Date of Patent: Dec. 28, 1993

[54] SILOXANE-BASED REFRIGERATING OIL

[75] Inventors: Robert Endres, Bergisch Gladbach; Hans-Horst Steinbach, Lindlar, both of Fed. Rep. of Germany

[73] Assignee: Bayer AG, Leverkusen, Fed. Rep. of Germany

[21] Appl. No.: 938,488

[22] Filed: Aug. 31, 1992

Related U.S. Application Data

[63] Continuation of Ser. No. 689,161, Apr. 22, 1991, abandoned, which is a continuation-in-part of Ser. No. 434,189, Nov. 13, 1989, abandoned.

[30] Foreign Application Priority Data

Nov. 22, 1988 [DE] Fed. Rep. of Germany ....... 3839333

[51] Int. Cl.$^5$ ................ C10M 105/76; C10M 107/50
[52] U.S. Cl. ..................................... 252/49.6; 252/68; 252/78.3
[58] Field of Search ................ 252/67, 68, 78.3, 49.6; 556/456, 460

[56] References Cited

U.S. PATENT DOCUMENTS

| | | | |
|---|---|---|---|
| 2,468,869 | 5/1949 | Daudt | 556/456 |
| 2,469,890 | 5/1949 | Patnode | 556/456 |
| 2,614,989 | 10/1952 | Hunter et al. | 252/49.6 |
| 4,537,691 | 8/1985 | Mori et al. | 252/49.6 |
| 4,772,409 | 9/1988 | Mori et al. | 252/78.3 |

FOREIGN PATENT DOCUMENTS

| | | |
|---|---|---|
| 0683140 | 3/1964 | Canada . |
| 0175282 | 3/1986 | European Pat. Off. . |
| 2373597 | 7/1978 | France . |

OTHER PUBLICATIONS

Hunter et al, "Organosilicon Polymers", Journal of the Amer. Chem. Soc., vol. 68, 2284, 1946.
Soviet Inventions Illustrated, SU-A-902426, Mar. 3, 1982.
Derwent Japanese Patents Report JP-A-61,157587, Jul. 1986.
Chemical Abstracts, vol. 68, No. 24, "Use of Organic Silicon Compounds in Refrigeration," 106349q (1968).

*Primary Examiner*—Christine Skane
*Attorney, Agent, or Firm*—Connolly and Hutz

[57] ABSTRACT

Refrigerating oils useful in refrigerating devices to produce temperatures lower than $-86°$ C. and as low as $-130°$ C. and free from salts, alcohols, halogenated hydrocarbons and halocarbons and having a viscosity below 10 mm$^2$/s at $-40°$ C., consisting essentially of mixtures of at least two members selected from the group consisting of hexamethyl disiloxane, octamethyl trisiloxane, linear decamethyl tetrasiloxane, octamethyl cyclotetrasiloxane and decamethyl cyclopentasiloxane.

16 Claims, No Drawings

SILOXANE-BASED REFRIGERATING OIL

This application is a continuation of application Ser. No. 07/689,161, filed Apr. 22, 1991, now abandoned.

This application is a continuation-in-part of the applicant's co-pending patent application Ser. No. 07/434,189, filed Nov. 13, 1989 now abandoned.

This invention relates to a refrigerating oil which consists of siloxanes and which is suitable for use at low temperatures down to $-140°$ C.

BACKGROUND OF THE INVENTION

It is known that silicone oils can be used for refrigerating mixtures providing oils having a viscosity in the range from 5 to 20 mm$^2$/s, as measured at 20° C., are used (W. Simmler, "G-I-T Fachzeitschrift fur das Laboratorium," 6, 101, 189, 278 -1962-). Since the application in question is static by nature, it is immaterial if the viscosity is relatively high at low temperatures.

On the one hand, the refrigerants of the refrigerating machine circuit itself (halocarbon and halogenated hydrocarbon compounds, such as for example R$^{11}$, R$^{12}$, R$^{22}$ and R$^{502}$) have hitherto been used as low-viscosity refrigerants at low temperatures; on the other hand, aqueous solutions of alcohols (methanol, ethylene and propylene glycol) and of salts (calcium chloride, soda, etc.) are used, depending on the temperature range. The disadvantages of these refrigerants are well known. On account of their low flashpoint, lower alcohols require elaborate safety precautions and, in some cases, are toxic. Aqueous salt solutions are highly corrosive and have an excessive viscosity at low temperatures. Finally, the halocarbon and halogenated hydrocarbon compounds are partly responsible for the photochemical degradation of the ozone layer and, in some cases, are also toxic. Accordingly, mixtures of silicone oils with halocarbon and halogenated hydrocarbon compounds, as described for example in Japanese patent application 50/453500, are poor compromises.

BRIEF DESCRIPTION OF THE INVENTION

The disadvantages mentioned above are obviated in refrigerants according to the present invention. The refrigerants according to the invention are refrigerating oils which are free from salts, alcohols, halogenated hydrocarbons and halocarbons and which have a low viscosity at low temperatures, characterized in that they consist of mixtures of hexamethyl disiloxane and/or octamethyl trisiloxane and/or linear decamethylene tetrasiloxane and/or octamethyl cyclotetrasiloxane and/or decamethyl cyclopentasiloxane. These refrigerating oils may be used at temperatures as low as $-130°$ C., or in some cases as low as $-140°$ C., without danger of solidification. The refrigerating oils of the present invention have a viscosity below 10 mm$^2$/s at $-40°$ C. and contain octamethyl trisiloxane in an amount of between 0.1 to 99% by weight, preferably 5 to 95% by weight and particularly preferred 10 to 90% by weight and decamethyl tetrasiloxane in an amount of between 99 to 0.1% by weight, preferably 95 to 5% by weight and particularly preferred 90 to 10% by weight, the weight percentages based on the weight of the oil. The octamethyl trisiloxane and/or decamethyl tetrasiloxane may be substituted for by equal amounts of at least one member selected from the group consisting of 0 to 23% by weight hexamethyl disiloxane, 0 to 15% by weight octamethyl cyclotetrasiloxane and 0 to 20% by weight decamethyl cyclopentasiloxane.

DETAILED DESCRIPTION OF THE INVENTION

The nomenclature for silicones as described, for example, in W. Noll, Chemie und Technologie der Silicone (Chemistry and Technology of the Silicones), 2nd Edition, pages 3 et seq (1968), is used in the following in the interests of simplicity. Accordingly, the linear siloxanes, octamethyl trisiloxane and decamethyl tetrasiloxane, are respectively abbreviated to $M_2D$ and $M_2D_2$ while the correspondingly higher homologs are generally abbreviated to $M_2D_n$. The cyclic siloxanes, octamethyl cyclotetrasiloxane and decamethyl cyclopentasiloxane, are abbreviated to the $D_4$ and $D_5$, respectively, while the higher homologs are abbreviated to $D_6$, $D_7$ etc.

These short-chain and cyclic siloxanes are obtained, for example, in an acidic equilibration reaction of $M_2$ (hexamethyl disiloxane) with silicone oil, which is formed by hydrolysis of dimethyl dichlorosilane (A-oil), in a ratio by weight of 1:1, and acidic ion exchanger, such as acid-activated bleaching earth for example, generally being used. If a reaction product of this type is heated after removal of the catalyst by filtration, a low viscosity siloxane mixture, such as, for example, Baysilone-Ol $M_3$ (a product of Bayer Ag, Leverkusen), is obtained. A characterization by GC analysis and a list of the corresponding boiling points is provided in Table 1. If a product mixture of this type is subjected to fractional distillation, the individual siloxanes can be separated from one another or the claimed siloxane mixture desired in accordance with the invention can be obtained by a corresponding distillation cut.

Among these discrete siloxanes, $M_2D_2$ appears at first to be the product with the best characteristic data for a refrigerating oil because it has a low viscosity at $-40°$ C. and a flash point above 55° C. This flash point is the reason why $M_2D_2$ is no longer classified as "inflammable" under the relevant legislation, so that no elaborate safety precautions have to be taken. However, pure $M_2D_2$ has a crystallization point of $-76°$ C. (see Table 2) which would seriously restrict its use as a refrigerating medium.

It has now surprisingly been found that additions of $M_2D$ and/or $D_4$ and/or $D_5$ greatly reduce the pour point or the solidification point of $M_2D_2$. In a proportion of up to 20% by weight, a mixture of $M_2D_2/M_2D$ gives a system which has a low viscosity at $-40°$ C. and a flash point above 55° C. If more $M_2D$ or $M_2$ is added, the viscosity and the solidification/pour point are reduced, as is the flash point, although this might be of interest for special industrial applications of deep cooling. The solidification point (according to DIN 51 556) is generally 3 to 5° C. below the associated pour point (according to DIN ISO 3016).

If either $M_2$ and/or the cyclic siloxanes $D_4$ and/or $D_5$ are added to $M_2D_2$ or to a mixture of $M_2D_2$ and $M_2D$, the addition should not exceed 30% by weight in the case of the $D_4$ and 50% by weight in the case of $D_5$ to avoid separation and crystallization clouding at low temperatures. $D_4$ is preferably added in a quantity of 5 to 15% by weight and $D_5$ in a quantity of 5 to 20% by weight, $D_5$ being superior to $D_4$ in its greater effectiveness in depressing the pour point and solidification point. As shown in the Examples of Tables 2 and 3, the siloxanes may be mixed in accordance with the invention in such a way that the viscosity at $-40°$ C. is below 10 mm$^2$/second and preferably as low as possible while the flash point is above 43° C. and preferably above 55° C.

If corresponding statistical mixtures of $M_2$ and higher $M_2D_n$ types (Examples of Table 4) are used instead of the claimed discrete siloxanes, the viscosity is increased and the flash point reduced, so that a refrigerating oil such as this is generally of poorer quality. However, in special applications where the low flash point is not a key factor, statistical mixtures having a very narrow distribution, as shown in Examples 17 to 19, may also be of interest. In that case, $M_2$ may be added to a mixture of the siloxanes $M_2D$ and $M_2D_2$ and $D_4$ and/or $D_5$ in a concentration of up to 23% by weight without the flash point falling below 21° C. A mixture such as this would be classified as "inflammable," although it would not necessitate the same safety precautions as "readily inflammable" substances or mixtures (flash point below 21° C).

The refrigerating oils thus produced may be used for refrigeration at temperatures of down to $-130°$ C. or even in some cases $-140°$ C. Acccordingly, the refrigerating oils are preferably used for cold stores, deep-freeze equipment freezers, but also for earth probes and other heating/refrigerating liquids which are associated with heat pumps and which, as already known, can cool down considerably after removal of the heat on the evaporator side of the heat pump. So-called brine systems such as these, which have hitherto been produced from mixtures of water and ethylene glycol, do not reach the low temperatures.

The refrigerating oils according to the invention have the advantage for this application that they are non-corrosive and toxicologically safe. Since, on the one hand, a mixture of $M_2D_2$ and $D_5$, as in Example 5, only changes into the solid aggregate state beyond $-130°$ C., but since on the other hand its individual components have high boiling points of 194° C. and 210° C. under normal conditions, applications involving extreme temperature stressing may also be considered, including for example automotive cooling fluids or transformer fillings in climates subject to wide variations in temperature.

The siloxane mixtures according to the invention may be colored to show up possible leakages. For example, quantities of 0.01% by weight of the following anthraquinone dyes may be stirred in at room temperature: anthraquinone, 1-aminoanthraquinone, 1,4-bis-isobutylaminoanthraquinone, 1-(3-dimethylaminopropylamino)-4-methylaminoanthraquinone, 1-(4-methylphenylamino)-anthraquinone, 1,4-bis-(2,6-diethyl-4-methylphenylamino)-anthraquinone, 1,4-bis-(4-tert.-butylphenylamino)-anthraquinone, 1-methylamino-4-(3-methylphenylamino)-anthraquinone, 1-methyamino-4-(4-methylphenylamino)-anthraquinone,1-(3-dimethylaminopropylamino)-4-(4-methylphenylamino)-anthraquinone.

In addition, quantities of up to about 0.002% by weight of the following natural dyes may be used for coloring: Ceresrot 7 B, Ceresgelb CRN, cochineal, Ceresblau GN.

The Examples of Tables 2 and 3 are intended to illustrate the invention. In addition, Table 2 shows the characteristic data of the associated pure substances. The siloxanes of Table 4 are mixtures of statistical siloxanes and show either a higher viscosity at low temperatures or a lower flash point than the corresponding mixtures of discrete siloxanes claimed in accordance with the invention.

TABLE 1

GC Analysis of Baysilon-1 $M_3$ and Physical Characteristics

| Component | % Area | Ret. Time (mins.) | Bp. (mm Hg)* (°C.) | |
|---|---|---|---|---|
| $M_2$ | 0.4 | 3.56 | 110.1 | (757) |
| $M_2D$ | 4.0 | 6.53 | 151.7 | (747) |
| $D_4$ | 0.4 | 8.36 | 175 | (760) |
| $M_2D_2$ | 16.7 | 9.53 | 194 | (760) |
| $D_5$ | 0.5 | 10.87 | 210 | (760) |
| $M_2D_3$ | 23.2 | 12.17 | 229 | (760) |
| $D_6$ | 0.1 | 13.41 | 245 | (760) |
| $M_2D_4$ | 18.8 | 14.49 | 184.2 | (101) |
| $M_2D_5$ | 12.9 | 16.54 | 184.5 | (40) |
| $M_2D_6$ | 8.4 | 18.37 | 202.0 | (39.3) |

*Lit.: W. Noll, Chemie und Technologie der Silicone (Chemistry and Technology of Silicones), 2nd Edition, pages 216 and 238 (1968)

TABLE 2

Discrete Siloxane Compounds

| Examples | Product | Solidification Point According to DIN 51 556 (°C.) | Viscosity at $-40°$ C. According to DIN 53 211 (mm$^2$/s) | Density at $-40°$ C. According to DIN 51 757 (kg/dm$^3$) | Flash Point According to DIN 51 755 (°C.) |
|---|---|---|---|---|---|
| 1 | 90% $M_2D$ + 10% $D_4$ | $-110$ | 3.3 | 0.893 | 44 |
| 2 | 90% $M_2D$ + 10% $D_5$ | $-140$ | 3.5 | 0.894 | 45 |
| 3 | 95% $M_2D_2$ + 5% $D_4$ | $-85$* | 5.4 | 0.917 | 58 |
| 4 | 90% $M_2D_2$ + 10% $D_4$ | $-98$* | 5.5 | 0.921 | 64 |
| 5 | 90% $M_2D_2$ + 10% $D_5$ | $-130$ | 6.0 | 0.923 | 76 |
| 6 | 81% $M_2D_2$ + 19% $M_2D$ | $-138$ | 4.7 | 0.908 | 57 |
| Characteristic Data of The Pure Substances for Comparison: | | | | | |
| | $M_2$ | $-68$ | 1.67 | 0.826 | 0 |
| | $M_2D$ | $-86$* | 3.0 | 0.878 | 43 |
| | $M_2D_2$ | $-76$* | 5.4 | 0.910 | 65 |
| | $D_4$ | $-17.5$* | at $-40°$ C. solid | | 56 |
| | $D_5$ | $-38$* | at $-40°$ C. solid | | 70 |

*Crystallization point

TABLE 3

Discrete Siloxane Mixtures

| Examples | Product Mixture % M₂ | % M₂D | % M₂D₂ | % D₄ | % D₅ | Solidification Point According to DIN 51 556 (°C.) | Viscosity at −40° C. According to DIN 53 211 (mm²/s) | Density at −40° C. According to DIN 51 757 (kg/dm³) | Flash Point According to DIN 51 755 (°C.) |
|---|---|---|---|---|---|---|---|---|---|
| 7  | —    | 31   | 64.3 | 4.7  | —    | −140   | 4.5  | 0.909 | 44 |
| 8  | —    | 18.1 | 77.1 | 4.8  | —    | −140   | 4.8  | 0.911 | 57 |
| 9  | —    | 19   | 68.5 | 12.5 | —    | −60*   | 5.1  | 0.920 | 55 |
| 10 | —    | 19   | 73.5 | 7.5  | —    | −134   | 4.8  | 0.908 | 56 |
| 11 | —    | 19   | 78.5 | 2.5  | —    | −135   | 4.7  | 0.908 | 57 |
| 12 | —    | 19   | 78.5 | —    | 2.5  | −135   | 4.75 | 0.910 | 63 |
| 13 | —    | 19   | 73.5 | —    | 7.5  | −135   | 5.0  | 0.915 | 64 |
| 14 | —    | 19   | 68.5 | —    | 12.5 | −136   | 5.18 | 0.920 | 63 |
| 15 | —    | 19   | 73.5 | 2.5  | 5    | −138   | 4.89 | 0.915 | 63 |
| 16 | —    | 5.6  | 82.4 | 11   | 1    | −136   | 5.1  | 0.920 | 59 |
| 17 | 22.9 | 33.3 | 43.8 | —    | —    | <−140  | 3.12 | 0.880 | 21 |
| 18 | 20.6 | 30.0 | 39.4 | 10   | —    | <−140  | 3.41 | 0.894 | 23 |
| 19 | 20.6 | 30.0 | 39.4 | —    | 10   | <−140  | 3.46 | 0.894 | 22 |

*Crystallization point

TABLE 4

For Comparison: Statistical Siloxane Mixtures

| Examples | Product Mixture % M₂ | % M₂D | % M₂D₂ | % D₄ | % D₅ | Solidification Point According to DIN 51 556 (°C.) | Viscosity at −40° C. According to DIN 53 211 (mm²/s) | Density at −40° C. According to DIN 51 757 (kg/dm³) | Flash Point According to DIN 51 755 (°C.) |
|---|---|---|---|---|---|---|---|---|---|
| 20 | Baysilone-01 M 3 | | | | | −130 | 12.4 | 0.955 | 74 |
| 21 | 80% Baysilone-01 M 3 + 20% M₂D | | | | | −128 | 8.85 | 0.937 | 62 |
| 22 | 79.4% Baysilone-01 M 3 + 9.88% M₂D + 10.7% M₂ | | | | | −134 | 7.67 | 0.931 | 34 |

We claim:
1. A refrigerating oil useful in refrigerating devices to produce temperatures lower than −86° C. and as low as −130° C. and free from salts, alcohols, halogenated hydrocarbons and halocarbons and having a viscosity below 10 mm²/s at −40° C., consisting essentially of a mixture of about 90 percent by weight octamethyl trisiloxane and one or more siloxanes selected from the group consisting of:
   (a) 0 to about 10 percent by weight of octamethyl cyclotetrasiloxane; and
   (b) 0 to about 10 percent by weight of decamethyl cyclopentasiloxane; wherein the weight percent is based on the weight of the oil and at least one siloxane from (a) or (b) is present in an amount greater than zero, and the total amount of the siloxanes from (a) and (b) in the mixture is at least about ten percent by weight.

2. The refrigerating oil of claim 1, wherein octamethyl cyclotetrasiloxane is present in an amount of about 10 percent by weight.

3. The refrigerating oil of claim 1, wherein decamethyl cyclopentasiloxane is present in an amount of about 10 percent by weight.

4. A refrigerating oil useful in refrigerating devices to produce lower than −86° C. and as low as −130° C. and free from salts, alcohols, halogenated hydrocarbons and having a viscosity below 10 mm²/s at −40° C., consisting essentially of a mixture of between 90 to about 95 percent by weight of decamethyl tetrasiloxane and one or more siloxanes selected from the group consisting of:
   (a) 0 to about 10 percent by weight of octamethyl cyclotetrasiloxane; and
   (b) 0 to about 10 percent by weight of decamethyl cyclopentasiloxane; wherein the weight percent is based on the weight of the oil and at least one siloxane from (a) or (b) is present in an amount greater than zero and the total amount of siloxanes from (a) and (b) in the mixture is at least about ten percent by weight.

5. The refrigerating oil of claim 4, wherein octamethyl cyclotetrasiloxane is present in an amount of about 10 percent by weight.

6. The refrigerating oil of claim 4, wherein decamethyl cyclopentasiloxane is present in an amount of about 10 percent by weight.

7. A refrigerating oil useful in refrigerating devices to produce temperatures lower than −86° C. and as low as −130° C. and free from salts, alcohols, halogenated hydrocarbons and halocarbons and having a viscosity below 10 mm²/s at −40° C., consisting essentially of a mixture of siloxanes selected from the group consisting of:
   (a) about 5.6 to 31 percent by weight of octamethyl trisiloxane;
   (b) about 64.3 to 82.4 percent by weight of decamethyl tetrasiloxane;
   (c) 0 to about 12.5 percent weight of octamethyl cyclotetrasiloxane; and
   (d) 0 to about 12.5 percent by weight of decamethyl cyclopentasiloxane; wherein the weight percent is based on the weight of the oil and at least one of the components (c) or (d) is present in an amount greater than zero and the weight percentages of the components (a) to (d) present in the oil mixture totals 100 percent.

8. The refrigerating oil of claim 7 wherein octamethyl trisiloxane is present in an amount of about 31 percent by weight and decamethyl tetrasiloxane is present in an amount of about 64.3 percent by weight and octamethyl cyclotetrasiloxane is present in an amount of about 4.7 percent by weight.

9. The refrigerating oil of claim 7 wherein octamethyl trisiloxane is present in an amount of about 18.1 to about 19 percent by weight and decamethyl tetrasiloxane is present in an amount of about 73.5 to about 78.5 percent by weight and octamethyl cyclotetrasiloxane is present in an amount of about 2.5 to about 12.5 percent by weight.

10. The refrigerating oil of claim 7 wherein octamethyl trisiloxane is present in an amount of about 19 percent by weight and decamethyl tetrasiloxane is present in an amount of about 68.5 to about 78.5 percent by weight and decamethyl cyclopentasiloxane is present in an amount of about 2.5 to about 12.5 percent by weight.

11. The refrigerating oil of claim 7 wherein octamethyl trisiloxane is present in an amount of about 19 percent by weight and decamethyl tetrasiloxane is present in an amount of about 73.5 percent by weight and octamethyl cyclotetrasiloxane is present in an amount of about 2.5 percent and decamethyl cyclopentasiloxane is present in an amount of about 5 percent.

12. The refrigerating oil of claim 7 wherein octamethyl trisiloxane is present in an amount of about 5.6 percent by weight and decamethyl tetrasiloxane is present in an amount of about 82.4 percent by weight and octamethyl cyclotetrasiloxane is present in an amount of about 11 percent by weight and decamethyl cyclopentasiloxane is present in an amount of about 1 percent by weight.

13. A refrigerating oil useful in refrigerating devices to produce temperatures lower than $-86°$ C. and as low as $-130°$ C. and free from salts, alcohols, halogenated hydrocarbons and halocarbons and having a viscosity below 10 mm$_2$/s at $-40°$ C., consisting essentially of a mixture of siloxanes selected from the group consisting of:
   (a) about 20.6 to about 33.3 percent by weight of hexamethyl disiloxane;
   (b) about 30 to about 33.3 percent by weight of octamethyl trisiloxane;
   (c) about 39.4 to about 43.8 percent by weight of decamethyl tetrasiloxane;
   (d) 0 to about 10 percent by weight of octamethyl cyclotetrasiloxane; and
   (e) 0 to about 10 percent by weight of decamethyl cyclopentasiloxane; wherein the weight percent is based on the weight of the oil and the weight percentages of the components (a) to (e) present in the oil mixture totals 100 percent.

14. The refrigerating oil of claim 13 wherein hexamethyl disiloxane is present in an amount of about 22.9 percent by weight and octamethyl trisiloxane is present in an amount of about 33.3 percent by weight and decamethyl tetrasiloxane is present in an amount of about 43.8 percent by weight.

15. The refrigerating oil of claim 13 wherein octamethyl cyclotetrasiloxane is present in an amount of about 10 percent by weight.

16. The refrigerating oil of claim 13 wherein decamethyl cyclopentasiloxane is present in an amount of about 10 percent by weight.

* * * * *